(No Model.)

J. D. WARD.
THERMOMETER.

No. 336,181. Patented Feb. 16, 1886.

Attest:
M. D. Phillips.
John D. Ward

Inventor:
J. D. Ward.
By E. B. Whitmore,
Atty.

UNITED STATES PATENT OFFICE.

JOHN D. WARD, OF ROCHESTER, NEW YORK.

THERMOMETER.

SPECIFICATION forming part of Letters Patent No. 336,181, dated February 16, 1886.

Application filed September 12, 1883. Serial No. 106,243. (No model.)

*To all whom it may concern:*

Be it known that I, JOHN D. WARD, of Rochester, in the county of Monroe and State of New York, have invented a new and useful Improvement in Thermometers, which improvement is fully set forth in the following specification and accompanying drawings.

The bulbs and calibers of thermometer-tubes as manufactured in quantities vary not only in diameters, but the latter are also frequently tapering, on account of which unavoidable mechanical imperfections the best instruments are made with scale-plates graduated to suit the range and peculiarity of each particular tube. If the caliber is large in diameter in proportion to the mercury or other fluid contained in the tube, the said fluid will move therein more slowly for given variations of temperature than if the caliber is small and more mercury is contained in the bulb, and if the caliber is tapering the fluid will move more rapidly at the small end of the caliber than at the large end.

The graduating of the plates to fit the range of each tube renders the manufacture of thermometers expensive, and to avoid which the graduations of the plates are sometimes averaged, and tubes having ranges varying within given limits are joined thereto, by doing which, however, the accuracy of the instruments is compromised.

To construct a scale-plate so graduated as to accommodate tubes varying in range and taper of caliber, and upon which all shall give correct readings, is the object of my invention.

Figure 1:
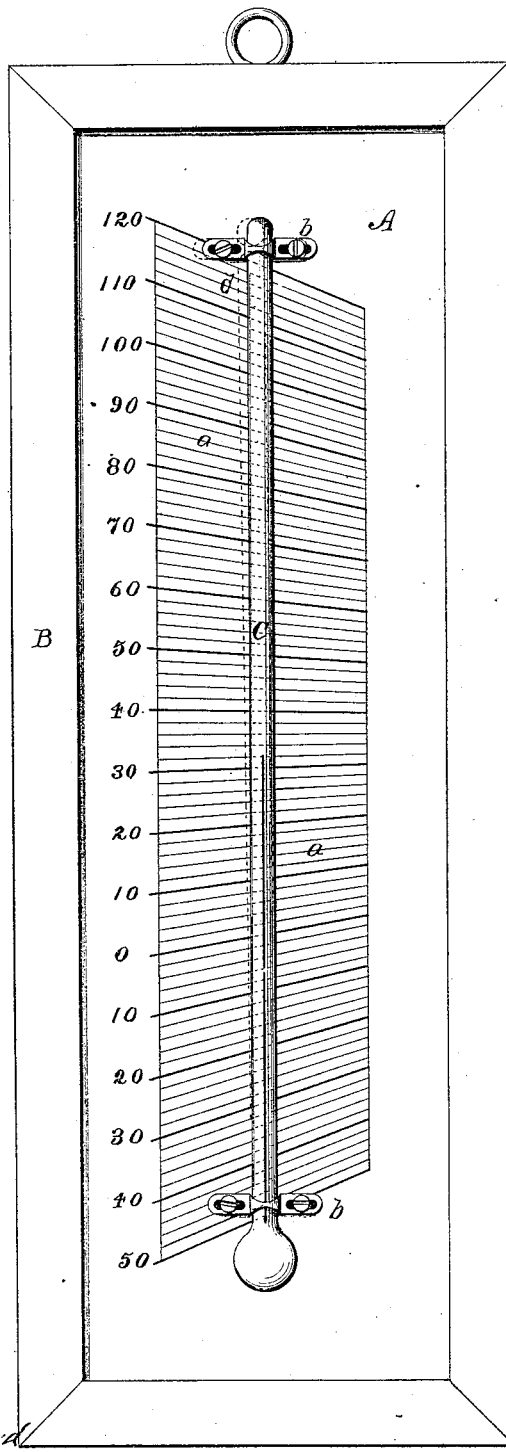
Figure 2:
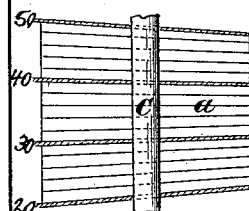

Figure 1 represents my improved thermometer with all parts in place; and Fig. 2 represents a detail view of a portion of the tube and scale-plate, the shaded lines corresponding to the black ones in Fig. 1.

A is the scale-plate, B the frame therefor, and C the tube. The graduation-lines $a$ of the scale-plate are made radial, as shown, on account of which the spaces inclosed between them are wider at one end than at the other. From this it will be understood that by moving the tube to the right or left a place will be found upon the scale at which the lines and spaces will correspond to the range of any tube within broad limits. For instance, if the bulb and caliber of the tube are such that the fluid will move rapidly during fluctuations of temperature the place for the tube will be toward the left-hand side of the scale, as shown in the drawings; but if the tube be such that the motion of the fluid is comparatively short as to distance its place will be at the right-hand side of the scale.

If the caliber be tapering, resulting in a motion of the fluid more rapid at one end of the tube than at the other, by placing the tube diagonally across the scale, as shown in dotted lines at $d$, a position will be found in which the lines will correspond to the unequal motion of the mercury due to the taper. Thus with this scale tubes of different range and variations in the range may be used, the tubes being so placed upon the scale that the temperature-readings will be correct for each, which cannot be done with a scale as commonly constructed with parallel lines and equal spaces.

The clasps or fasteners $b$ for the tube I form with slots for the screws, as shown, by means of which the tube may be moved toward one side or the other, for the purpose of adjusting it upon the scale, either bodily or at one end.

To facilitate in reading, I manufacture some of these improved scale-plates with red lines in place of the heavy black lines and shaded lines, as indicated in Figs. 1 and 2, respectively, opposite the numbers, the intermediate lines being black. By so doing there will be a contrast in the lines without making some broader than the others, broad lines being objectionable, as the reading of the position of the mercury is not as accurate when the lines are heavy and broad.

It may be preferable to slot the plate instead of the clasps $b$, to facilitate the adjustments of the tube above mentioned, and other colors besides red and black may be employed of which to make the lines.

It is well known to manufacturers of thermometers that the tubes shrink slowly for some time after they are manufactured, and if filled when comparatively new and fitted to a scale-plate correctly they will gradually change or grow to give untrue readings on account of this shrinkage, which sometimes amounts to two degrees in the reading between the freezing and boiling points of water.

With my improved scale-plate this can be compensated for by a side adjustment of the tube, as stated.

I am aware that it is not new to use circular scale-plates having radial graduations and divided into spaces which are broader at their outer than at their inner boundary, an index-finger being caused to travel over the same. Such scale-plates I do not claim; nor do I claim scale-plates used for testing purposes, which have spaces which taper from one side to the other, but form no part of a thermometer.

I claim as my invention—

1. A thermometer scale-plate having the graduation-marks thereon formed so as to include spaces that are wider at one end than at the other, in combination with a tube secured across the scale in an inclined position, substantially as and for the purpose set forth.

2. A scale-plate for thermometers, having the graduation-marks thereon made radial or so as to include spaces that are wider at one end than at the other, said spaces being arranged in vertical series, substantially as and for the purpose set forth.

3. A scale-plate for thermometers, having the graduation-marks made so as to include spaces that are wider at one end than at the other, said lines being made of contrasting colors, substantially as and for the purpose set forth.

4. In combination with a thermometer-tube, a scale-plate which is attached thereto to complete the thermometer, said scale-plate having a trapezoidal area divided by lines joining the major and minor bases thereof, said lines dividing the said bases into equal parts, substantially as shown.

5. A thermometer scale-plate having the graduation-marks thereon formed so as to include spaces that are wider at one end than at the other, said spaces being arranged one above another in vertical series, in combination with a tube secured thereto across said spaces, substantially as shown and set forth.

6. A thermometer scale-plate having the graduation-marks thereon formed so as to include spaces that are wider at one end than at the other, in combination with a tube secured thereto by fastenings admitting of lateral adjustments of the tube, substantially as and for the purpose set forth.

JOHN D. WARD.

Witnesses:
 E. B. WHITMORE,
 M. D. PHILLIPS.